United States Patent [19]
Poore

[11] 4,150,565
[45] Apr. 24, 1979

[54] VEHICULAR SINGLE SHAFT GAS TURBINE ENGINE POWER SYSTEM

[75] Inventor: Bernard B. Poore, Waterloo, Iowa
[73] Assignee: Deere & Company, Moline, Ill.
[21] Appl. No.: 850,309
[22] Filed: Nov. 10, 1977

Related U.S. Application Data

[62] Division of Ser. No. 623,319, Oct. 17, 1975, Pat. No. 4,109,772.

[51] Int. Cl.² ............................................. G01M 15/00
[52] U.S. Cl. .................................................... 73/133 R
[58] Field of Search ........................ 73/116, 117.3, 118, 73/133 R

[56] References Cited
U.S. PATENT DOCUMENTS

| | | |
|---|---|---|
| 2,975,633 | 3/1961 | Hautzenroeder ...................... 73/118 |
| 3,686,935 | 8/1972 | May ................................... 73/118 X |

Primary Examiner—Jerry W. Myracle
Attorney, Agent, or Firm—Fraser and Bogucki

[57] ABSTRACT

A vehicular gas turbine engine power system includes an engine, an automatic clutch, a service clutch and an infinitely variable transmission coupled successively along a power train. A vehicle control system controls engine speed, transmission ratio and automatic clutch engagement in response to operator selected ground speed and engine speed commands as well as other vehicle conditions. The vehicle control system operates in a manual mode to maintain engine speed as commanded by an operator or in an automatic mode to maintain an engine speed which will minimize fuel consumption. The transmission ratio is controlled for fixed rate vehicle acceleration toward a commanded speed if sufficient power is available. Otherwise ground speed is cut back to match required power with available power. However, ground speed cut back is limited as a safety feature and disengagement of the automatic clutch prevents engine stall when the engine becomes overloaded.

10 Claims, 10 Drawing Figures

F1 FUNCTIONAL ELEMENT 54

F2 FUNCTIONAL ELEMENT 60

VEHICULAR SINGLE SHAFT GAS TURBINE ENGINE POWER SYSTEM

This is a division of application Ser. No. 623,319 filed Oct. 17, 1975, now U.S. Pat. No. 4,109,772.

BACKGROUND OF THE INVENTION

1. Field of the Invention

This invention relates to single shaft gas turbine engine vehicle power systems and more particularly to vehicle power systems with automatic engine speed and transmission ratio control.

2. Description of the Prior Art

A turbine engine having a power turbine rotor which is directly coupled for rotation with a compressor rotor may be referred to as a single shaft gas turbine engine. Such engines are used extensively for fixed speed applications such as generation of electricity because of their low initial cost and superior reliability. However, the curve representing torque variations with respect to engine speed for such engines has a steep, narrow peak. As a result, a single shaft gas turbine engine develops maximum torque and power at a particular engine speed which is typically in the range of 50,000 to 70,000 R.P.M. This speed at which maximum torque and power are developed is often referred to as 100% rated speed, and torque and power decrease rapidly as engine speed increases or decreases away from the 100% rated speed.

Because of this torque-speed characteristic single shaft gas turbine engines have not been extensively used in vehicular applications where a substantial and continuous range of operating speeds is required. However, a single shaft gas turbine engine may be utilized to advantage in a vehicular power system when coupled with an infinitely variable transmission. With a proper control system, operation of such an arrangement may be maintained with the transmission ratio controlled to provide engine operation at 100% rated speed under full load conditions. Under part load conditions the transmission ratio may be continuously adjusted for optimum part load fuel consumption irrespective of vehicle speed. An automatic control system for such an arrangement was presented to the Society of Automotive Engineers Mid-Year Meeting, Montreal, Quebec, Canada, June 7-11, 1971. The presentation has been published as SAE publication number 710551, "Controls for Single Shaft Gas Turbine Vehicles," by Bernard E. Poore.

The present invention provides further improvements in power systems of the type therein described. For example, the energy required to start a vehicular gas turbine engine is considerable. A single shaft gas turbine engine must typically be accelerated to about 55% of its rated speed before engine operation becomes self sustaining. At this speed the engine is rotating at several thousand R.P.M. and considerable kinetic energy is possessed by the rotating parts of the engine. The engine starting system must supply not only this kinetic energy, but also energy to overcome engine friction and energy to drive vehicle accessories and their drive gears. Connection of vehicle accessories "behind" the service clutch would mean interruption of the accessories each time the service clutch is disengaged. This would be undesirable and unnecessary for accessories such as air conditioner compressor and perhaps unacceptable for accessories such as an alternator, an hydraulic pump or an air compressor. Furthermore, an automatically controlled turbine power system may be somewhat more subject to engine stall under heavy load conditions where a vehicle operator is anticipating automatic operation and an overload condition causes engine stall before the operator can act to relieve the overload. In the event of a stall a considerable delay is encountered as the engine is restarted, and, as explained above, a considerable burden is placed on the starting system.

Another problem associated with known vehicular turbine power systems is an inadequate indication of vehicle operating conditions. In a conventional gasoline engine or diesel engine vehicle power system, there is a substantial relationship between engine speed and vehicle load. A tachometer indication is thus adequate for proper vehicle operation. However, when a vehicle is powered by a turbine engine and infinitely variable transmission having an automatic control system there may be little relationship between engine speed and vehicle load. Some further indication of vehicle load condition then becomes desirable.

SUMMARY OF THE INVENTION

A vehicular gas turbine engine power system in accordance with the invention includes a single shaft gas turbine engine providing rotational energy, an automatic clutch coupled to receive rotational energy from the engine and output the energy only when engaged, a service clutch coupled to receive rotational energy from the output of the automatic clutch and output the energy when selectively engaged by an operator, an infinitely variable transmission coupled to receive rotational energy output from the service clutch and output rotational energy at a variable torque ratio for vehicle locomotion, and a vehicle control system. The vehicle control system is coupled to control engine speed, transmission ratio and automatic clutch disengagement in response to engine and vehicle speed commands from an operator. A vehicle load meter indicates engine speed as well as vehicle load conditions with a continuous range of indicated magnitudes.

The control system operates in a manual mode wherein an engine speed control lever is advanced to maintain engine operation at a speed indicated by the lever. A transmission ratio is commanded which will maintain vehicle speed as indicated by a vehicle speed lever, except that vehicle speed is reduced if there is insufficient power available at the commanded engine speed. In an automatic mode of operation indicated by placement of the engine speed lever in a neutral position, a transmission ratio is commanded which will maintain vehicle speed as selected by the speed control lever if sufficient power is available. Engine speed is controlled in response to exhaust gas temperature and engine speed feedback for operation at 100% rated speed under full load conditions and for optimum fuel consumption under part load conditions.

The automatic clutch is controlled for automatic disengagement at engine speeds below 55% rated speed and automatic engagement at engine speeds above 55% rated speed. This engagement speed is selected as being slightly greater than a stall speed below which engine operation can be self sustained but less than normal idle speed. A memory circuit prevents limit cycling under an overload condition by inhibiting clutch reengagement following disengagement until reset by a manual reset switch. The reset switch may be conveniently implemented as part of a starter switch to permit an automatic reset at start-up. With essential engine driven accessories such as a fuel pump or an oil pump coupled ahead of the automatic cluch and non-essential accessories coupled behind the automatic clutch, the load on the starting system can be greatly reduced during start-up by automatic disconnection of the unessential accessories. However, once a normal idle speed is attained the unessential accessories are driven in a conventional manner without interruption. The automatic clutch also operates to prevent engine stall in the event an overload condition occurs. This prevents a long restart delay as well as additional wear on the starter system.

A vehicle load meter operates in response to engine speed and vehicle speed cut back to indicate vehicle load conditions with a display indication which may increase continuously in magnitude throughout a plurality of load indication ranges. The indication may be provided by a simple meter having a pointer which is rotated in proportion to the magnitude of an input signal. In a lower range of indication part load engine speed is indicated from 0 to 100% of rated speed. The meter thus functions as a conventional tachometer in the lower range of indication. As load demands on a vehicle are increased in an automatic mode of operation the engine operating speed is first increased to 100% rated speed. Then, while the engine is maintained at 100%, further load increases cause a reduction in transmission ratio to decrease the load by decreasing vehicle speed until the load demand matches engine power. An intermediate meter range indicates this ground speed cutback by summing a G1 ERROR signal indicating the difference between commanded and actual speed with an N1 engine speed signal which indicates 100% engine speed in this range of operation. the gain of the ground speed error signal is selected to cause the indicator to change from an indication of 100% rated speed at the lower end of the intermediate range to maximum cutback at the upper end of the intermediate range as ground speed cutback reaches 50% of commanded speed.

A safety feature of the control system becomes operative as ground speed cutback reaches 50% to prevent further reductions in the transmission ratio. This feature prevents an accidental setting of commanded ground speed at more than twice the actual ground speed. Sudden and excessive accelerations are thus prevented upon termination of an overload condition. Beyond 50% ground speed cutback engine speed is reduced and a normally small engine speed error signal which controls fuel flow begins to increase. A threshold circuit senses this increase to clamp the engine speed signal at 100%. The increased engine speed signal thus causes the indicator to increase in magnitude through an upper range of indication as engine speed cutback occurs. A 55% engine speed at which automatic overload clutch disengagement occurs may be marked on the meter scale in the upper range and a stall speed may be marked beyond the automatic clutch point.

The vehicle load meter thus operates in an automatic mode to provide an indication of vehicle load condition which is much more useful than a mere tachometer indication. In a manual mode of operation the meter operates as a tachometer within the lower range of indication.

BRIEF DESCRIPTION OF THE DRAWINGS

A better understanding of the invention may be had from a consideration of the following detailed description, taken in conjunction with the accompanying drawings, in which.

DETAILED DESCRIPTION

Figure 1:
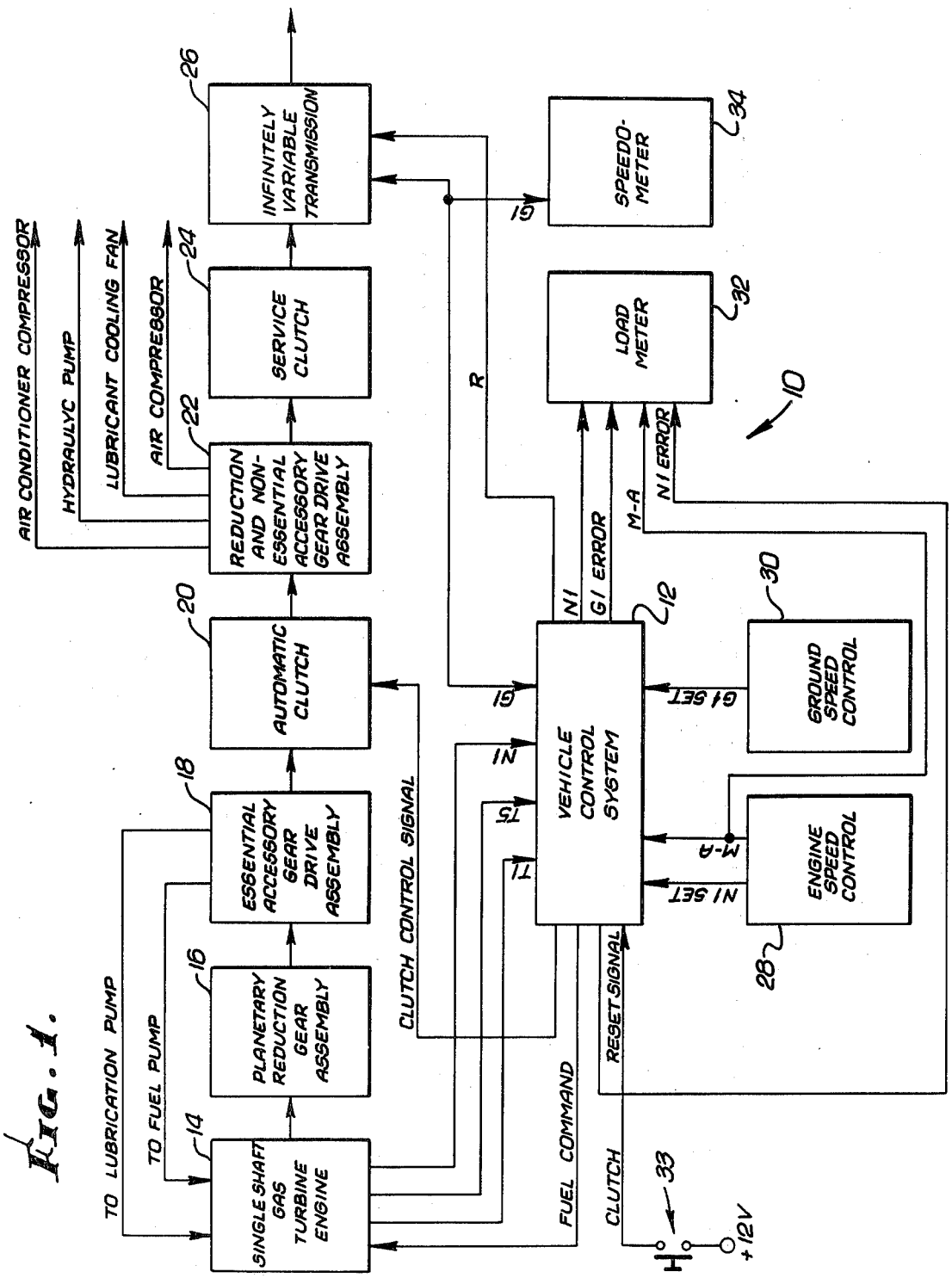
FIG. 1 is a block diagram representation of a single shaft gas turbine engine vehicular power system in accordance with the invention.

As shown in FIG. 1, a vehicular single shaft gas turbine engine power system 10 in accordance with the invention includes a vehicular control system 12 and an associated power train and operator interface elements. The power train includes respectively a single shaft gas turbine engine 14, a planetary reduction gear assembly 16, an essential accessory gear drive assembly 18, an automatic clutch 20, a reduction and non-essential accessory gear drive assembly 22, a service clutch 24, and an infinitely variable transmission 26. The infinitely variable transmission 26 is coupled to drive the vehicle wheels in a conventional manner, for instance through a differential rear end. The operator interface elements include an engine speed control 28, a ground speed control 30, a load meter 32, a speedometer 34, and a reset switch 33.

The single shaft gas turbine engine 14 is characterized by a compressor and a single power turbine coupled for fixed ratio rotation about the same shaft. Such an engine has a curve representing torque as a function of engine speed with a rather steep, narrow peak. It thus becomes necessary to operate the engine within a relatively narrow speed range to obtain substantial power from the engine. Engine speed is controlled in a conventional manner by regulating the engine fuel flow in response to a fuel command signal which is normally proportional to the difference between a commanded and an actual engine speed. As the fuel command signal increases in magnitude, the fuel flow rate is increased and the engine 14 delivers more power. If load conditions will permit, the increased power causes the engine to accelerate until a reduction in the N1 error signal commands a reduction in the fuel command signal and thus fuel flow rate. Three principal engine condition signals are communicated from the engine 14 to the vehicle control system 12. These include an intake air temperature signal (T1), an exhaust gas temperature signal (T5), and an engine tachometer or velocity signal (N1).

A planetary reduction gear assembly 16, which may be conventional in nature, is coupled to receive high velocity rotational energy from the turbine engine 14 and provide a velocity reduction and corresponding torque increase of approximately 5:1. The 100% speed velocities of about 60,000–70,000 R.P.M. at the output of turbine engine 14 are reduced to approximately 12,000–14,000 R.P.M. at the output of reduction gear assembly 16.

An essential accessory gear drive assembly 18 is coupled to receive rotational energy from gear reduction assembly 16 and generate mechanical energy for driving essential accessories. Power outputs to the engine 14 to drive a fuel pump and a lubrication pump are shown by way of example. A drive system for power brakes or power steering might be another example of essential accessories. The accessories which are driven by essential accessory drive gear assembly 18 are directly and continuously coupled to the engine 14 and are energized so long as the engine 14 is running.

An automatic clutch 20 is coupled to receive rotational energy from essential accessory drive gear assembly 18 and output rotational energy to reduction and non-essential accessory gear drive assembly 22. It should be appreciated that the power train might readily be slightly modified by directly coupling the automatic clutch 20 and the accessory gear drive assembly 18 to the planetary reduction gear assembly 16 by separate parallel power paths rather than in series as shown. In either case, both the automatic clutch 20 and the essential accessory gear drive assembly 18 would be directly and continuously coupled to receive rotational energy from turbine engine 14. Automatic engagement and disengagement of automatic clutch 20 is controlled by a clutch control signal generated by vehicle control system 12. It is anticipated that automatic clutch 20 should be continuously engaged under normal operating circumstances. However, the clutch control signal may be generated to disengage automatic clutch 20 during engine start-up and during emergency overload conditions. For start-up, a turbine engine must typically be accelerated to a velocity of approximately 55% of the maximum torque velocity before engine operation can be self-sustaining. The engine starting system must be able to supply a considerable amount of energy in order to overcome the load which results from the inertia and friction of the rotating parts as this high speed is attained. Disengagement of automatic clutch 20 permits a reduction in this inertial and frictional load by requiring the driving during start-up of only the planetary reduction gear assembly 16 through which the starter is typically coupled and essential accessories. The energy which must be supplied by the starting system is thus greatly reduced.

Automatic clutch 20 may also be disengaged to prevent engine stall during emergency overload conditions. For example, it is anticipated that the vehicle control system 12 should monitor the engine operating speed as indicated by signal N1 and generate a clutch control signal which will cause clutch disengagement in the event that the engine speed decreases to a speed which is very near the engine stall speed of approximately 55%. Disengagement of automatic clutch 20 removes the overload condition and permits the engine 14 to accelerate without stalling. A normal delay of about 30 seconds and the attendant load demand on the starting system for an extra start-up is thus avoided. In order to prevent limit cycling in the event of an overload condition, once the automatic clutch is disengaged the vehicle control system 12 inhibits further engagement until activation of a clutch reset signal provided by switch 33. Switch 33 may be advantageously implemented as part of the normal ignition switch for the vehicle.

A reduction and non-essential accessory gear drive assembly 22 is coupled to receive rotational energy output from automatic clutch 20 and drive the service clutch 24. Gear drive assembly 22 also provides mechanical energy for driving non-essential vehicle accessories which may include an air conditioner compressor, an hydraulic pump, a lubricant cooling fan, and an air compressor by way of example. Other accessories may of course be provided as required by the nature and use of the vehicle.

Service clutch 24 is a conventional, operator controllable clutch which selectively couples the transmission to the engine. In some vehicles having an automatic transmission, the service clutch may not be required. In other vehicles, such as a standard farm tractor, use of a service clutch 24 may be desirable even in conjunction with an automatic transmission.

An infinitely variable transmission 26 is coupled to receive rotational energy from service clutch 24 when selectively engaged and output rotational energy at a variable torque ratio to the primary vehicle drive system. For example, infinitely variable transmission 26 may be coupled to drive selected wheels of a vehicle through either a fixed or selectively variable discrete gear ratio. Infinitely variable transmission 26 is shown as providing the vehicle control system an actual ground speed indication signal (G1). For a fixed gear ratio between the output of transmission 26 and the vehicle drive wheels, signal G1 is directly proportional to the rotational velocity at the output of transmission 26. In the event that transmission 26 is coupled to drive a variable gear ratio system, it would be necessary to either generate signal G1 from some other location or modify signal G1 in accordance with the selected gear ratio. Infinitely variable transmission 26 provides a gear ratio which is variable over a finite, but continuous ratio spectrum in proportion to a ratio signal (R) generated by vehicle control system 12. Transmission 26, which may be conventional in nature, has a response time which is relatively fast in comparison with the response time of the vehicle control system 12. The error between the gear ratio commanded by signal R and the actual gear ratio is therefore very small (less than 5%) and the vehicle control system assumes that the actual gear ratio is identical to the commanded gear ratio. In the event that an infinitely variable transmission 26 is employed in which substantial differences may develop between the commanded and actual gear ratios, it may be desirable to provide the vehicle control system 12 with an additional input signal which indicates the actual gear ratio of transmission 26.

The engine speed control 28 operates in a manner analogous to a throttle on a conventional manually controlled vehicle. Associated with the engine speed control is a manual-automatic switch which generates an M-A signal which indicates an automatic mode of operation when the engine speed control 28 is positioned in an inactive position and indicates a manual mode of operation when the engine speed control is actuated. When actuated, the engine speed control generates an engine speed command signal (N1 set) and the vehicle control system 12 operates to maintain engine speed at the commanded speed if possible. The ground speed control 30 may be operated either independent of or in conjunction with the engine speed control 28. Ground speed control provides a signal G1 set in proportion to the positioning of the ground speed control 30. In the manual mode of operation, signal G1 set operates substantially as a gear ratio command signal. Infinitely variable transmission 26 and vehicle control system 12 operate to provide a gear ratio and hence a ground speed in proportion to signal G1 set. The transmission ratio and hence ground speed are automatically reduced if the engine cannot supply sufficient power to maintain the commanded ground speed at the engine speed which is commanded by the engine speed control 28.

In an automatic mode of operation, the engine speed control 28 is deactivated and vehicle operation is controlled solely by the ground speed control 30. In this automatic mode of operation, the G1 set signal operates solely as a ground speed command signal. If sufficient power is available, vehicle control system operates to accelerate the vehicle along a predetermined acceleration curve to the commanded ground speed. In the automatic mode of operation, vehicle control system simultaneously and interactively controls the transmission ratio and engine velocity to permit the engine to operate near its most efficient operating point for a given load condition. No attempt is made to maintain any particular engine velocity. In the event that sufficient power is not available the vehicle control system permits the actual vehicle speed to be decreased by as much as 50% of the commanded speed. If further speed reductions are required in view of available engine power, an overload condition is allowed to occur. This speed reduction limit is a safety feature which prevents inadvertent advancement of the ground speed control 30 to a relatively high commanded speed while the vehicle is operating at a relatively low speed due to a heavy load condition. If such a great difference between commanded and actual ground speed were allowed to occur, the vehicle might suddenly and rapidly accelerate toward the commanded speed in the event that the load were removed. If the vehicle were in a potentially dangerous situation where the operator anticipated and required continued low vehicle speed, this sudden acceleration might cause an accident. The speed reduction limit thus operates to insure that sudden speed changes of more than 2:1 cannot occur without manipulation of the ground speed control 30 by the operator.

Other operator interface elements include the load meter 32 and the speedometer 34. The speedometer 34 is a conventional ground speed indicator which operates in response to signal G1. Load meter 32 is a relatively sophisticated instrument which provides indications of engine speed and engine load in combinations that depend upon particular vehicle operating conditions. This instrument is explained in greater detail below.

Figure 2:
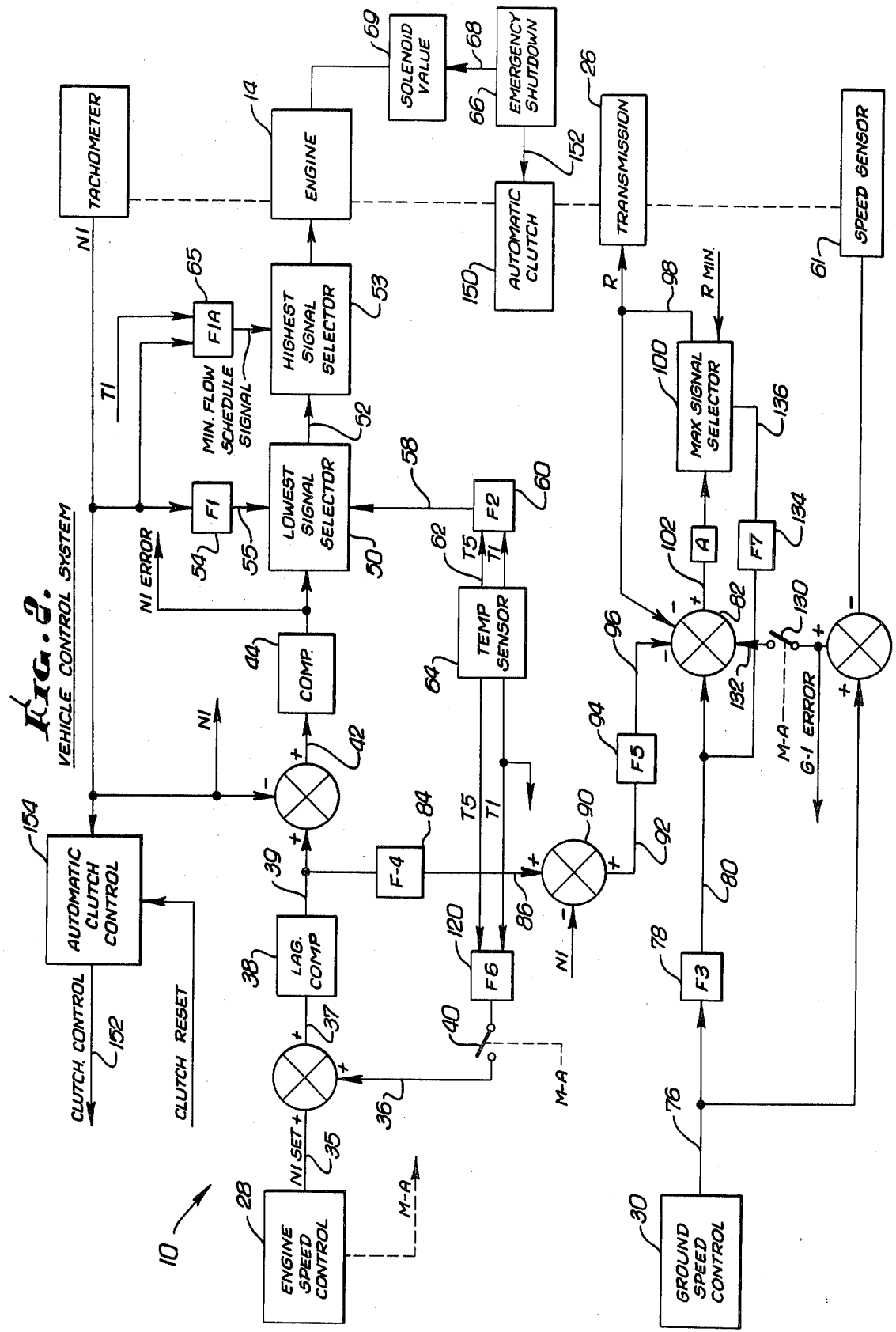
FIG. 2 is a schematic and block diagram representation of a vehicular control system for use in the vehicular power system shown in FIG. 1.

Referring now to FIG. 2, portions of the vehicular engine power system 10 are shown in greater detail to permit a complete understanding of the invention. For purposes of clarity and simplicity, some conventional features of a vehicular control system such as engine start-up and idle controls have been omitted or simplified. However, it should be assumed that such conventional features are present in the control system even though they are not explicitly shown. Furthermore, gain modification elements such as operational amplifiers have not been explicitly shown. However, it will be appreciated by one of ordinary skill in the art that conventional gain control elements may be added to the signal paths as required to provide proper matching of signal amplitudes.

In a manual mode of operation, an engine speed lever within engine speed control 28 is advanced and an engine speed set signal 35 is generated which is proportional to the lever advance position. The engine speed set signal is summed with a temperature speed control signal 36 to generate an uncompensated engine speed control signal 37. A lag compensator 38 receives the uncompensated engine speed command signal 37 and generates an engine speed command signal 39. The lag compensator 38 closely matches the time rate of change of the engine speed command signal 39 with the acceleration capability of engine 14 for better stability. In a manual mode of operation, a mode control switch 40, which may be a relay or electronic switch, is maintained in an open condition by signal M-A and the engine speed command signal 39 is substantially representative of the position of advancement of an engine speed control lever within engine speed control 12.

A negative feedback loop is completed for conrol of engine speed by subtracting the actual engine speed signal N1 from the engine speed command signal 39 to generate an uncompensated engine speed error signal 42. A compensator element 44 modifies the uncompensated engine speed error signal 42 with either proportional gain or preferably proportional gain plus the time integral of the uncompensated engine speed error signal 42 to generate an N1 ERROR signal which actually controls engine speed by controlling the amount of fuel supplied to engine 14 under normal operating conditions.

Figure 3:
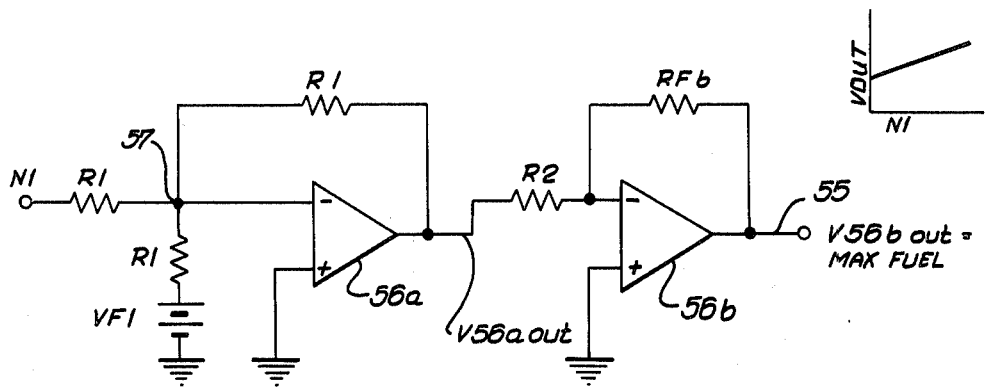
FIG. 3 is a schematic representation of a circuit for an F1 functional element shown in FIG. 2.

A lowest signal selector 50 receives a plurality of different control signals including the N1 ERROR signal and passes on the one of said control signals which is of smallest magnitude as a fuel control signal 52 through a highest signal selector 53 to engine 14. The N1 ERROR signal provides the normal engine control and the other signals are of a safety or precautionary nature. For example, an F1 functional element 54 receives tachometer signal N1 and generates a maximum fuel signal 55 in accordance with a predetermined maximum fuel schedule which limits the rate at which fuel can be supplied to the engine 14 at any given engine speed, N1. For example, since the maximum fuel schedule is a limit and not a normal control it may be implemented with a circuit as shown in FIG. 3 with operational amplifiers 56$a$ and 56$b$ connected as inverting summing and amplifier circuits, respectively. Since summing amplifier 56$a$ drives feedback resistor R1 with a voltage maintaining node 57 at ground potential, the output voltage is V56$a$out = $-$(N1+VF1). The maximum fuel signal 55 is then V56$b$out=(RF$b$/R2) (N1+VF1). A more complex maximum fuel schedule may of course be developed if desired.

A temperature limited fuel signal 58 is generated by an F2 functional element 60 in response to engine temperature signals. A temperature sensor 64 senses both exhaust gas temperature and air intake temperature to generate the engine temperature signal T5 which generally represents exhaust gas temperature and signal T1 which represents intake air temperature. The engine temperature signal T5 may be reduced somewhat by signal T1 as the sensed air intake temperature increases to permit the engine 14 to run slightly hotter on a hot day. The F2 functional element 60 prevents overheating of the engine 14 by subtracting a signal V1250, which indicates a temperature of 1250° F. from the adjusted exhaust gas temperature signal T5ADJ. The difference is then subtracted from a low temperature output voltage Vlow only when the difference is positive. For example, the temperature limited fuel signal 58 might remain at a maximum value, Vlow, until signal T5ADJ indicates an adjusted exhaust gas temperature of 1250° F. As the exhaust gas temperature signal T5ADJ continues to increase the temperature limited fuel signal 58 might then be proportionately decreased to cut off all fuel supply to the engine 14 as the engine temperature signal increases to indicate an adjusted exhaust gas temperature of 1300° F.

Figure 4:
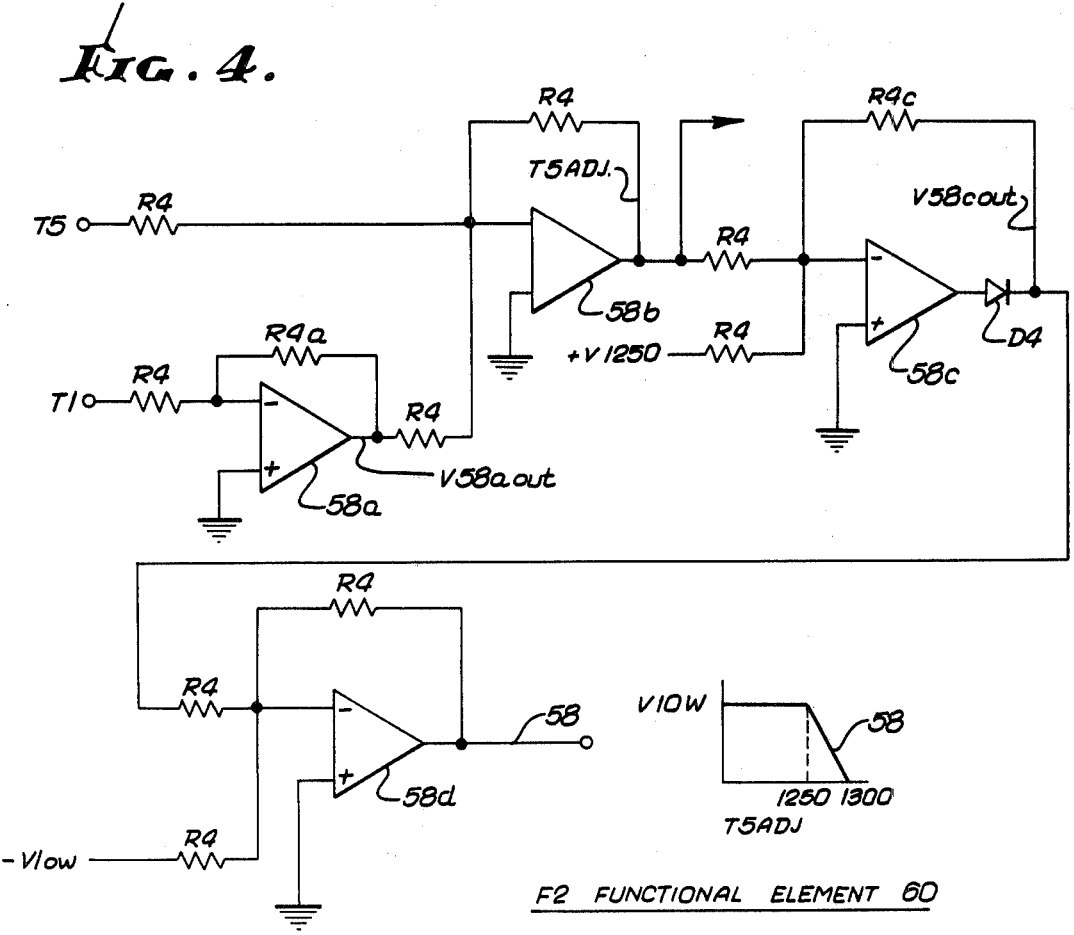
FIG. 4 is a schematic representation of a circuit for an F2 functional element shown in FIG. 2.

The circuit for F2 functional element 60 is shown in FIG. 4. An operational amplifier 58a is coupled to receive the inlet gas temperature signal T1 and generate an output signal having a voltage V58aout = −T1 (R4a/R4) which is used to adjust exhaust gas temperature signal T5. The adjustment is determined by the gain, R4a/R4. For example, if this gain is ½ as assumed for this example, exhaust gas temperature T5 would be permitted to increase ½ degree for each one degree increase in inlet gas temperature T1.

An operational amplifier 58b is coupled as a summing amplifier to generate an output voltage −T5ADJ = −(T5+V58aout) = −(T5−T1 (R4a/R4)). Operational amplifier 58c is also coupled as a summing amplifier to generate an output voltage V58cout = −(-T5ADJ+V1250)    R4c/R4 = R4c/R4 (−T5ADJ−V1250) if diode D4 is temporarily ignored. Voltage V1250 is selected to equal signal T5ADJ at an adjusted exhaust gas temperature of 1250° F. where fuel cutback is to begin. The gain R4c/R4 is selected to cause output voltage V58cout to change by a voltage equal to a voltage Vlow as signal T5ADJ changes in response to an exhaust gas temperature change of 50° F. Diode D5 substantially blocks the output V58cout unless signal T5ADJ indicates an exhaust gas temperature greater than 1250° F.

Another operational amplifier 58d is also coupled as a summing amplifier to generate temperature limited fuel signal 58 = −(V58cout−Vlow) = Vlow−V58cout. At low exhaust gas temperatures output V58cout is approximately zero and temperature limited fuel signal 58 = Vlow to permit a substantial fuel flow. If the adjusted exhaust gas temperature increases above 1250° F., signal 58 = Vlow−V58cout = Vlow−R4c/R4 (−T5ADJ−V1250.

The highest signal selector 53 receives the fuel control signal 52, which is the normal fuel flow control signal, as well as a minimum flow schedule signal and passes on the highest of the two signals as a modified fuel control signal to control fuel flow. The minimum flow schedule signal from F1A functional element 65 enables adequate fuel flow for start-up and idle. Although the function may be more complicated if desired, the minimum flow schedule signal may increase linearly with engine speed and be decreased somewhat as T1 increases (mass flow decreases). A typical functional relationship would be

MFS = (M) (N1) + P (Q−T1) = (M) (N1) + (P)
(Q) − (P) (T1)

where MFS is the minimum fuel schedule signal and M, P and Q are constants which are selected for best performance of the particular combustion and engine assembly. F1A functional element 65 may be suitably implemented with summing and amplifier circuits similar to those for implementing the F1 functional element 54 which are shown in FIG. 3.

An emergency shutdown element 66 monitors conditions which might permanently damage the engine and generates an emergency fuel control signal 68 which is normally high but drops to zero to shut down the engine in the event that an emergency condition is detected. For example, the emergency shutdown element 66 might cause engine shutdown in the event that exhaust gas temperature gets too high, in the event that a proper starting sequence does not occur, in the event of a 110% engine overspeed condition, in the event of an oil pressure loss, or in the event of some other emergency condition that is deemed desirable to monitor. The emergency fuel control signal 68 is communicated to a solenoid valve 69 which is connected to interrupt the engine fuel supply when deactivated by the emergency fuel control signal 68 going low.

The engine speed control 28 thus operates in a manual mode to control engine speed substantially independent of any other vehicle conditions. The engine speed control might be advantageously used to supply power while a vehicle is at stand still for applications such as a power take off on a farm tractor or for a dump lift on a dump truck. However, with the ground speed control 30 simultaneously activated, the engine speed control 28 may also be utilized to modulate vehicle speed by controlling engine speed and hence engine power in a manner quite similar to the speed control provided by the throttle of an ordinary automobile with automatic transmission. For a single shaft gas turbine engine, the output power and torque of the engine reach a maximum at a rated 100% speed and decrease rapidly as the engine speed increases above or decreases below the 100% rated speed. Good control over engine speed is thus very important for control of a vehicle having a single shaft gas turbine engine.

Figure 5:
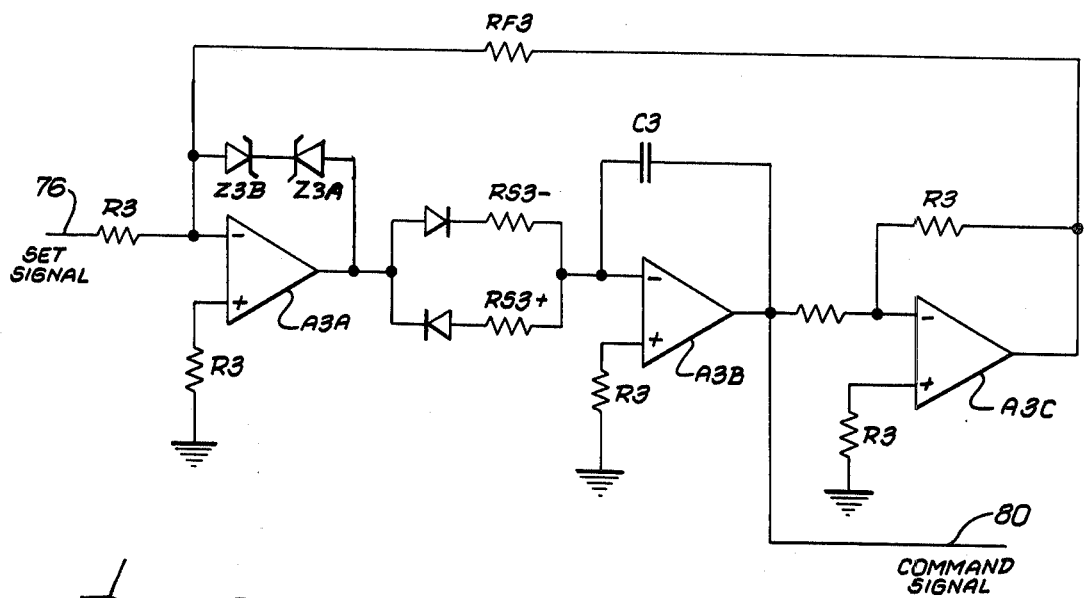
FIG. 5 is a schematic representation of a circuit for an F3 functional element shown in FIG. 2.

If the ground speed control 30 is actuated, for example by advancement of an operator controllable lever arm, while in a manual mode of operation, a ground speed set signal 76 is generated in proportion to the lever position. This signal operates as a transmission ratio selector in the manual mode. The ground speed set signal 76 is communicated to an F3 functional element 78 which responds by generating a ground speed command signal 80. F3 functional element 78 allows the ground speed command signal 80 to approximately follow the ground speed set signal 76 except that the ground speed command signal 80 is permitted to increase in magnitude only as a ramp function with a predetermined slope. The ramp slope is adjusted to be commensurate with the ability of the engine 14 to accelerate the vehicle, and so long as the power capability of engine 14 is not exceeded, determines the rate at which vehicle ground speed increases. FIG. 5 illustrates a circuit which will provide the suggested signal relationship. When the voltage of the set signal changes diode Z3A or Z3B causes the output of amplifier A3A to act as a reference voltage across resistor RS3 or RS3+, depending on polarity. The output of amplifier A3B then changes with a slope of dV/dt = (ZV−0.6/RS3C). RS3+ determines the slope of a positive going ramp while RS3− determines the slope of a negative going ramp. By choosing (RS3−)(C) sufficiently small, the command signal 80 can follow changes in the set signal 76 substantially instantaneously. ZV is the Zener breakdown voltage plus a forward diode voltage drop of diodes Z3A and Z3B. Amplifier A3C merely provides negative feedback in an outer loop so that the command signal 80 can follow set signal 76 with a gain of RF3/R3 under steady state conditions.

The ground speed command signal 80 is communicated to a summing junction 82 and a negative feedback loop for control of transmission ratio is completed by subtracting a signal R which is proportional to and indicates transmission ratio. In the absence of other factors the ground speed command signal thus increases with a predetermined ramp when ground speed control 80 is actuated and the control loop causes the transmission ratio to increase approximately along the ramp commanded by the ground speed command signal 80. If the engine speed is permitted to remain constant during this ramping period the vehicle ground speed will also accelerate in approximate conformity to the ramp. However, the vehicle may be pulling an unusually heavy load or the engine speed control may be set at a position which does not permit full engine power to be developed. Under such circumstances there may not be sufficient engine power available to permit the vehicle to accelerate along the ramp commanded by the ground speed command signal 80. In the absence of other control signals the engine 14 would be unable to meet the power demand and would stall.

However, additional negative feed back is provided to summing junction 82 to reduce the transmission ratio and thus the power demand on the engine 14 when the demanded power exceeds that which the engine 14 can supply. An F4 functional element 84 responds to the engine speed command signal 38 by generating a modified engine speed command signal 86. Sudden reductions in the transmission ratio are avoided for purposes of stability by permitting the modified engine speed command signal 86 to increase only along a ramp function. The modified engine speed command signal 86 can rapidly follow a step function decrease in the engine speed command signal 39. Construction of the F4 functional element 84 may be substantially the same as the F3 functional element 78 which is shown in FIG. 5. A summing junction 90 receives the modified engine speed command signal 86 as a positive input and the actual engine speed signal N1 as a negative feedback input and generates a transmission control engine speed error signal 92 as an output.

Figure 6:
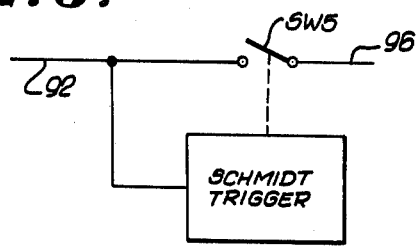
FIG. 6 is a schematic representation of a circuit for an F5 functional element shown in FIG. 2.

An F5 functional element 94 receives the transmission control engine speed error signal 92 and generates a ratio reduction signal 96 in response thereto. The ratio reduction signal is never permitted to go negative so that it cannot tend to increase the transmission ratio and for reasons of stability, the ratio reduction signal 96 follows the transmission control engine speed error signal 92 only when the transmission control engine speed error signal 92 is positive and exceeds a predetermined threshold magnitude. The ratio reduction signal 96 otherwise has a zero magnitude and does not affect the transmission ratio. A possible implementation of F5 functional element 94 is shown in FIG. 6. When signal 92 exceeds the threshold the Schmidt trigger closes switch SW5. It has been found that adequate stability and good response characteristics are attained when the threshold magnitude is set at approximately 2%. That is, the ratio reduction signal 96 becomes active when the actual engine speed N1 becomes less than 98% of the commanded engine speed as indicated by the modified engine speed command signal 86. Thus, when the load demanded of engine 14 exceeds its power capabilities, engine speed is reduced below that which is commanded and the ratio reduction signal 96 is generated to reduce the transmission ratio and thereby decrease the load demand.

Actual transmission ratio is commanded by a transmission ratio signal R which is generated as the output of a maximum signal selector 100. Under normal circumstances signal R is generated by linear amplification of a ratio error signal 102 which is generated as the sum of the inputs to summing junction 82. Maximum signal selector 100 is a circuit which receives a plurality of inputs and generates the one input with the largest magnitude as the output. An actuator within transmission 20 is able to follow a commanded transmission ratio R with a speed which is rapid compared to the acceleration rate for engine 14 and the signal R is taken as an accurate representation of both commanded and actual transmission ratio.

In an automatic mode of operation the engine speed set signal 30 remains at zero and switch 40 remains continuously closed to permit the temperature speed control signal 36 to command engine speed. The temperature speed control signal 36 is generated by an F6 functional element 120 in response to adjusted exhaust gas temperature signal $-T5ADJ$ which may be derived as in F2 functional element 60.

The F6 functional element 120 may take any one of several possible arrangements which automatically control engine operation to attain good fuel economy by keeping the engine 14 operating with an exhaust gas temperature at or near the maximum temperature of approximately 1250° F. In a first functional relationship which is illustrated as curve F6 in FIG. 7, the temperature speed control signal 32 is clamped at 60% when the adjusted exhaust gas temperature signal indicates an exhaust gas temperature at or below 600° F. Under this circumstance the engine 14 is caused to idle at 60% of its rated speed. As the adjusted exhaust gas temperature signal increases above an indication of 600° F. the temperature speed control signal 36 is increased proportionately up to a magnitude sufficient to command a maximum speed of 100% rated speed as the adjusted exhaust gas temperature signal reaches a maximum permissible temperature of approximately 1250° F. Minimum basic specific fuel consumption (optimum fuel efficiency) occurs when exhaust gas temperature is at a maximum. This first arrangement for the F6 functional element permits the engine to be automatically operated near the high exhaust gas temperature for good fuel consumption when under substantial load.

If an increased load is applied to the engine 14 while at idle or under partial load, the exhaust gas temperature increases, and an increased operating speed is commanded. As the commanded operating speed exceeds the actual operating speed an N1 error signal is developed which causes more fuel to be supplied to the engine. The engine responds by accelerating until the exhaust gas temperature decreases to cause a decrease in the commanded operating speed. The engine thus seeks an increased operating speed where the increased power output can match the increased power demand.

Figure 8:
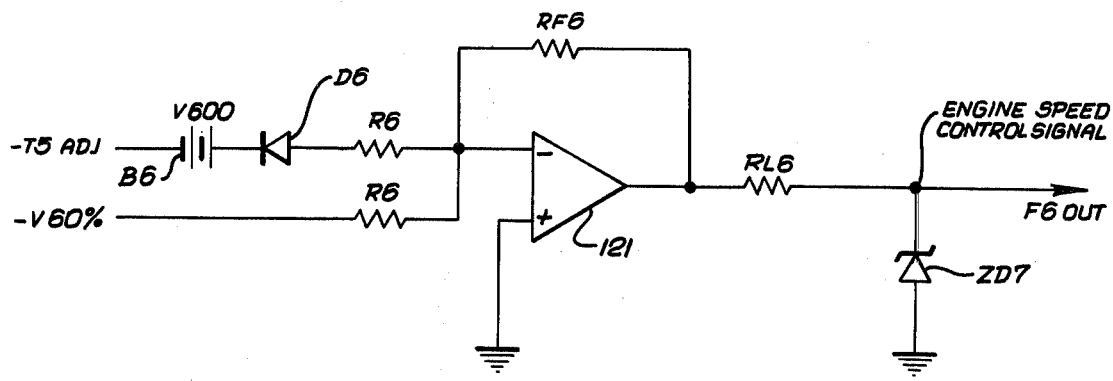
FIG. 8 is a schematic representation of a circuit for an F6 functional element shown in FIG. 2.

A circuit for generating the functional relationship of F6 functional element 120 is shown in FIG. 8. Operational amplifier 121 is coupled in a summing amplifier configuration to generate an output voltage $$F6out = -RF6/R6(-V60\% + (-T5ADJ + V600)) = RF6/R6(V60\% + T5ADJ - V600)$$

when adjusted exhaust gas temperature is between 600° F. and 1250° F. Below 600° F. −T5ADJ has no effect on circuit operation because diode D6 is reverse biased and the output voltage F6out is clamped at F6out=(RF6/R6)V60%. Above 1250° F. resistor RL6 and Zener diode ZD7 operate to clamp the output voltage at the Zener breakdown voltage which should be selected to indicate 100% engine speed. The circuit gain RF6/R6 should be selected to cause the output to change from 60% to 100% engine speed command as −T5ADJ changes from an indication of 600° F. to an indication of 1250° F. Voltage −V60% should be selected in view of the circuit gain to cause a minimum 60% output signal and the voltage of battery B6 plus the forward conduction voltage drop of diode D6 equal V600 should equal the voltage of signal −T5ADJ at an adjusted exhaust gas temperature of 600° F.

Figure 7:
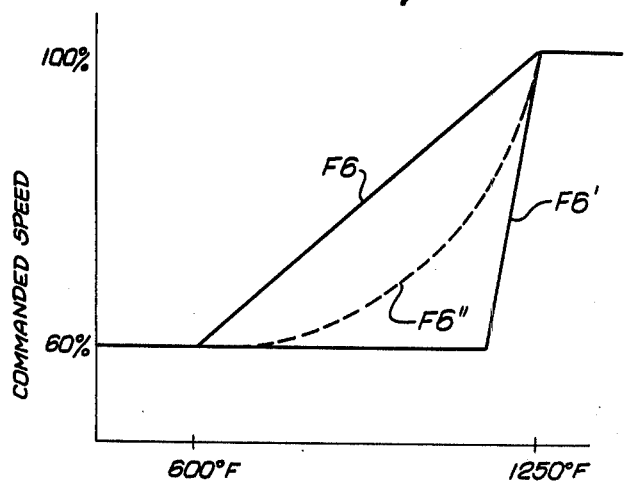
FIG. 7 is a graphical representation of relationships which are pertinent to the control system shown in FIG. 2.

By modifying the proportional curve F6 to make it somewhat steeper as represented by the curve F6' shown in FIG. 7, the engine operating speed can be biased toward an even higher temperature (lower speed) operating point with slightly better fuel efficiency. In this second configuration of F6 functional element 120, the gain RF6/R6 is increased and voltage V600 is increased to equal signal −T5ADJ at a temperature of about 1200° F. This second arrangement tends to improve steady state part load fuel consumption efficiency by operating the single shaft gas turbine engine 12 even closer to the exhaust gas temperature limit under part load conditions. However, the higher gain decreases operating point stability and the engine 14 becomes more subject to acceleration and deceleration.

Figure 9:
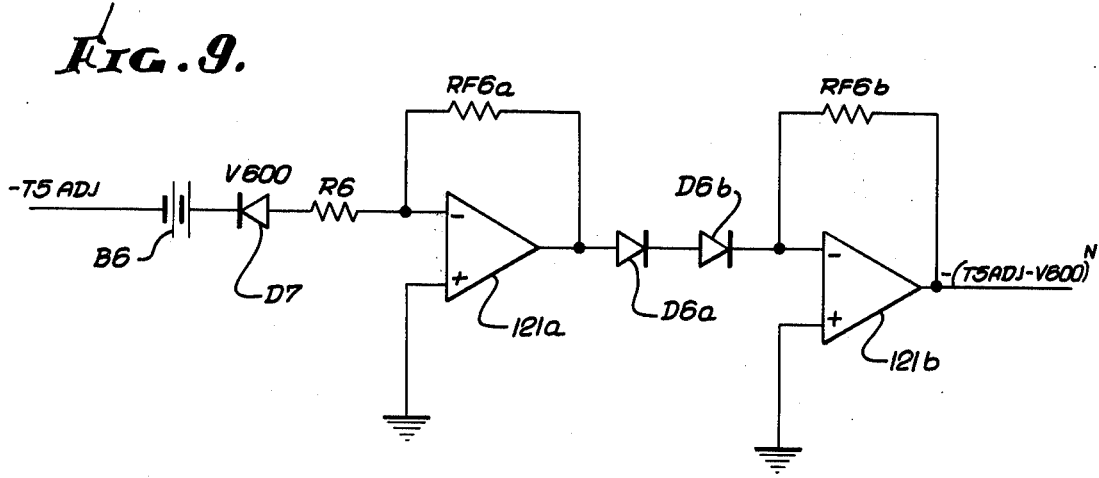
FIG. 9 is a schematic representation of a circuit for an F7 functional element shown in FIG. 2.

Still a third arrangement which offers a compromise between the higher efficiency under moderate load provided by curve F6' and the better stability of curve F6 is illustrated by curve F6'' in FIG. 7. This functional relationship can be approximated by substituting the circuit shown in FIG. 9 for battery B6 and diode D6 in FIG. 8. An operational amplifier 121a is coupled as an inverting amplifier to change the gain of signal −T5ADJ, which is normalized by battery B6 and diode D7 to present a negative voltage at the input to amplifier circuit 121a beginning at zero volts as adjusted exhaust gas temperature increases beyond 600° F. The gain, RF6a/R6, of amplifier 121a is selected to generate an output voltage less than or equal to about 1.2 volt at a temperature of 1250° F. The output of amplifier 121a is coupled through two diodes D6a and D6b to the input of another inverting amplifier circuit 121b. Diodes D6a and D6b pass a circuit therethrough which has an expotential relationship to the output voltage from amplifier 121a. Feedback resistor RF6b controls the gain of amplifier 121b, which generates an output voltage that is proportional to the current through diodes D6a and D6b. Resistor RF6b should be selected to produce an output voltage that is coincident with the voltage at the anode of diode D6 in FIG. 8 when signal −T5ADJ indicates 1250° F. Regardless of which arrangement is selected for F6 functional element 120, the automatic control operates the engine 14 at a speed which will maintain a relatively high exhaust gas temperature and provide good fuel efficiency for a given load condition. This is in contrast to manual constant speed operation in response to the engine speed control 28 wherein a commanded engine speed is followed without regard to fuel efficiency.

Control over the transmission is substantially the same in the automatic mode of operation as in the manual mode of operation except that a switch 130 is closed in response to the automatic indication of the M-A signal to add an outer ground speed error loop into the transmission ratio control system. This is accomplished by subtracting the G1 actual ground speed signal from the ground speed set signal 76 and adding the difference as a positive input 132 to summing junction 82. The magnitude of the resulting G1 ERROR signal is maintained relatively low in comparison to the magnitude of the ground speed command signal 80 and the ratio reduction signal 96 so that the G1 ERROR signal has minimal effect upon the transmission ratio R during transient operating conditions. Once these other signals become approximately balanced with the transmission ratio signal R, the G1 ERROR signal operates as a fine tuning signal to provide somewhat more precise control over actual ground speed.

An F7 functional element 134 cooperates with the maximum signal selector 100 to implement a special safety feature associated with the vehicle power system 10. Under a full load condition the vehicle ground speed is controlled by adjusting the transmission ratio to match the vehicle load with available power. For example, a tractor plowing hard ground might have the ground speed control 30 set for a ground speed of 18 miles per hour while the available power would permit a ground speed of only one mile per hour. Under such circumstances it might be possible for an operator to think the ground speed control 30 has been set for 3 miles per hour when it has actually been unknowingly bumped by the operator and set to 18 miles per hour. Under such circumstances if the load is removed from the tractor, for example, by lifting the plow out of the ground at the end of a furrow, the tractor would accelerate at maximum rate towards 18 miles per hour. This sudden and unexpected acceleration might cause the tractor operator to lose control and if the tractor is near a ditch or a building serious damage might result before the tractor is brought back under control.

An under speed limit circuit avoids this possibility by providing a transmission ratio override signal 136 in response to the ground speed command signal 80. Ratio override signal 136 commands a transmission ratio R which will result in an actual ground speed of approximately 50% of the ground speed indicated by the ground speed command signal 80 at 100% engine speed. The maximum signal detector 100 operates to permit the override signal 136 to become operative only when its magnitude exceeds the signal R which is generated in response to ratio error signal 102. A circuit for implementing F7 functional element 134 may be implemented with two equal resistors and a diode coupled successively between signal 80 and ground with signal 136 taken from the common coupling of the resistors. The diode provides a small offset to improve operating characteristics near zero vehicle velocity. Under normal circumstances the engine 14 has sufficient power to maintain the vehicle speed at more than half the commanded speed and the under speed limit circuit has no effect on vehicle operation. However, if the vehicle encounters a large load the ground speed cutback which results from reduction of the transmission ratio R will be limited by the under speed limit circuit to 50% of the command ground speed. Under such circumstances the engine 14 will be unable to develop sufficient torque to overcome the load and will decelerate toward a stall condition unless the commanded vehicle speed is reduced.

If infinitely variable transmission 26 is of the non-slip type having a ratio which is infinitely variable down to R=0, use of the service clutch 24 is required for stopping. Furthermore, the possibility of an infinite torque ratio between the engine and drive wheels must be prevented. For such a transmission the input of a fixed voltage signal R MIN to maximum signal selector 100 places a lower limit on the attainable transmission ratio. This ratio should be selected such that application of vehicle service brakes to halt a vehicle without disengagement of the service clutch would cause engine 14 to overload and stall before mechanical damage is sustained by the power train.

An additional feature of the vehicle power system 10 is the automatic clutch 20 that is controlled in response to a clutch control signal 152 which is generated by an automatic clutch control circuit in response to the actual engine speed signal N1. Any time the signal N1 indicates an actual engine speed below 55% of rated speed, which is very near the no load engine stall speed, the automatic clutch control circuit 154 senses this low signal condition and generates a clutch control signal 152 which commands disengagement of the automatic clutch 150. Disengagement of automatic clutch 20 removes most of the load from the engine 14 and permits the engine to accelerate to the 60% normal idle speed. A memory circuit, such as a flip-flop, within the automatic clutch control circuit 154 becomes set any time the clutch control signal 152 disengages the automatic clutch 20 and remains set to inhibit the clutch control signal 152 from commanding reengagement of the automatic clutch until the memory circuit is reset by the clutch reset signal. This reset requirement prevents a limit cycle condition wherein the automatic clutch is repeatedly disengaged as the engine 14 accelerates above or decelerates below the 55% cutoff point. The clutch reset signal may be advantageously generated by an ignition-starter switch which permits the automatic clutch control to be automatically reset each time the engine 14 is started. The starter system may be disabled in response to signal N1 to prevent a starter response to actuation of the ignition switch to generate the reset signal when the engine is idling following disengagement of automatic clutch 20. The automatic clutch prevents a total loss of power due to engine stall, eliminates a loss of time required for restarting the engine, and reduces the wear and tear on the vehicle battery and starter system which may result from repeated start-ups.

Figure 10:
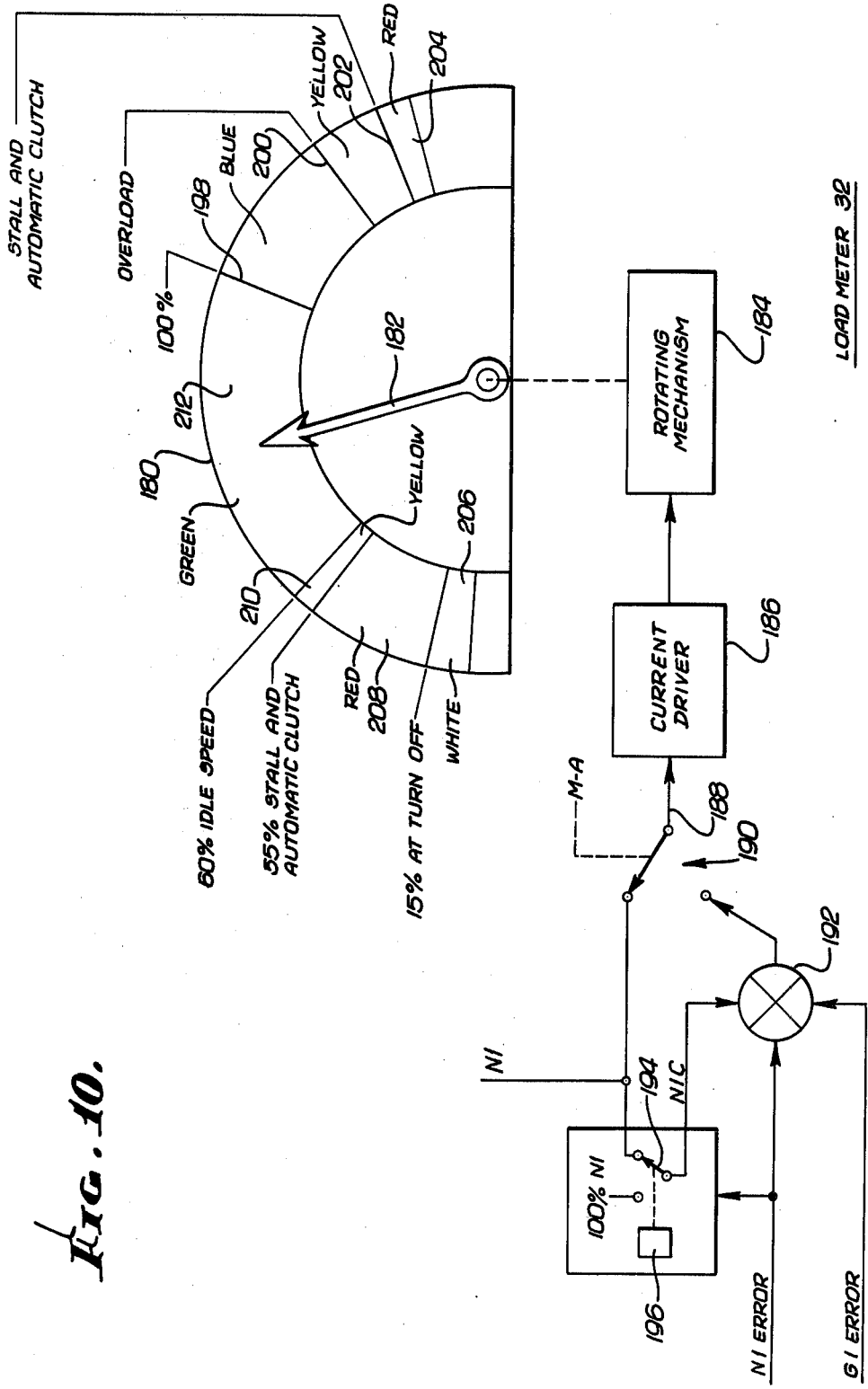
FIG. 10 is a schematic and block diagram representation of a load meter for use with the vehicular power system shown in FIG. 1.

As shown in FIG. 10, the load meter 32 includes a conventional D'Arsonval movement panel meter 180 having a pointer 182 with a rotational position controlled by a rotating mechanism 184 which causes the rotational position to be proportional to current supplied by a current driver 186. Current driver 186 generates a current which is proportional to a load signal 188 from a switch 190. Switch 190 responds to the M-A (Manual Automatic) mode signal to connect the load signal 188 to the N1 engine speed during a manual mode of operation. Load meter 32 thus serves as a standard tachometer to indicate engine speed over a range of 0 to 100% of rated speed in the manual mode of operation.

In an automatic mode of operation, switch 190 is repositioned to provide the load signal 188 from the output of a summing junction 192. Summing junction 192 receives as inputs the ground speed error signal, G1 ERROR; the engine speed error signal, N1 ERROR; and a clamped engine speed signal, N1C. During part load and full load engine operating conditions, a switch 194 is positioned by an actuator 196 to provide the summing junction 192 with a clamped engine speed signal equal to the actual engine speed signal, N1. Thus, under part load conditions, the load meter 32 operates as a tachometer to indicate engine speed in a manner substantially identical to the manual mode of operation.

As load is increased, the automatic control system causes the engine speed to increase to 100% rated speed and the indicator 182 is rotated to a marker angle 198 to indicate this engine speed. As a further load is placed on the vehicle, the power output of engine 14 cannot be increased and the additional load is compensated by reducing the transmission ratio to provide a ground speed less than the commanded ground speed. This ground speed cutback causes generation of a voltage on the G1 ERROR signal which is added by summing junction 192 to the 100% N1 engine speed signal to cause the indicator 182 to rotate further in a clockwise direction beyond the 100% engine angle 198 to an overload indication angle 200. The gain of the G1 ERROR signal is selected in cooperation with the positioning of overload angle indication 200 in such a manner that the indicator 182 rotates to the overload position at angle 200 as the ground speed cutback reaches 50% of the command ground speed.

At this point, the F7 functional element 134 and the maximum signal selector 100 operate as shown in FIG. 2 to limit any further ground speed cutback. Further increases in the vehicle load must then cause the engine 14 to overload and begin slowing down. As the engine 14 slows down, the engine speed becomes less than the 100% speed commanded by the automatic control system 12 and the engine speed error signal, N1 ERROR, begins to increase in magnitude. As signal N1 ERROR exceeds a relatively small threshold which is normally required for activation of an engine fuel valve at 100% engine speed, actuator 196 senses this increase and repositions switch 194 to clamp signal N1C at a voltage equal to the voltage of signal N1 at 100% engine speed. Summing junction 192 thus receives a clamped engine speed signal N1C, which has a magnitude sufficient to drive indicator 182 to the 100% indicator position 198; plus a G1 ERROR signal which has a magnitude sufficient to drive the indicator 182 beyond the 100% engine speed indication 198 to an overload indication position 200; plus an N1 ERROR signal which is added to the signal N1C and G1 ERROR to drive the indicator 182 clockwise beyond the overload indication 200 toward a stall and automatic clutch indication position 202. The gain of the N1 ERROR signal and the positioning of the stall and automatic clutch position 202 are selected such that indicator 182 rotates to the stall and automatic clutch indication position 202 as the engine decelerates toward the stall velocity under an overload condition. This would typically occur at an engine velocity at approximately 55% which would be equal to an engine speed error of 45%. Indication angle 202 is the point at which the automatic clutch 20 would normally be disengaged to prevent a complete engine stall. A red indication area 204 is provided counterclockwise of the stall and automatic clutch indication position 202 to indicate further overload magnitudes in the event that automatic clutch 20 is not disengaged. Movement of indicator 182 into the red zone 204 indicates that the engine velocity has decreased below a self-sustaining velocity and that engine stall is inevitable.

For convenience of the operator, additional color coded zones may be provided on the panel meter 180 and engine speed markings may be provided at shorter intervals than are shown in the 0 to 100% speed range. For example, a start zone 206 may be colored white between 0 and 40% speed indication angles. At 15% of rated speed, fuel is typically turned on during start-up or turned off during shut down. A fuel zone 208 may thus be established between the 15% fuel off speed and the 55% stall and automatic clutch speed and colored red to indicate a zone within which the fuel is on but engine velocity is not self-sustaining. This red zone complements the overload red zone 204 which is indicated when engine speed drops below a self-sustaining speed while engine 14 is under load. A yellow zone 210 may be conveniently provided between indications of the 55% stall and automatic clutch speed and the 60% normal idle speed. A speed range 212 between the 60% idle speed and 100% speed is the normal operating speed range for engine 14 and might typically be colored green.

While there has been shown and described a preferred arrangement of a vehicular single shaft gas turbine engine power system in accordance with the invention for the purpose of enabling a person of ordinary skill in the art to make and use the invention, it will be appreciated that the invention is not limited thereto. Accordingly, any modifications, variations or equivalent arrangements within the scope of the attached claims should be considered to be within the scope of the invention.

What is claimed is:

1. A load meter for a vehicular gas turbine engine comprising a magnitude indicator connected to indicate (1) a magnitude which is directly proportional to engine operating speed within a first magnitude range which extends between a first low indicated magnitude and a second indicated magnitude greater than the first indicated magnitude, (2) a magnitude which is proportional to the sum of (a) engine operating speed and (b) a ground speed error which represents the difference between commanded and actual vehicular ground speed within a second magnitude range which extends between a third indicated magnitude which is greater than or equal to the second indicated magnitude and a fourth indicated magnitude which is greater than the third indicated magnitude, (3) a magnitude which is proportional the sum of (a) engine operating speed, (b) ground speed error and (c) an engine speed error which represents a difference between actual engine speed and engine speed at a maximum torque operating condition within a third magnitude range which extends between a fifth indicated magnitude which is greater than or equal to the fourth indicated magnitude and a sixth indicated magnitude greater than the fifth indicated magnitude.

2. The load meter as set forth in claim 1 above, wherein the second and third indicated magnitudes are substantially the same and indicate an engine operating speed at which maximum torque is developed.

3. The load meter as set forth in claim 1 above, wherein the second magnitude range indicates a range of operation wherein engine speed is maintained at approximately a maximum torque operating speed as ground speed error is increased in response to a decrease in a ground speed to engine speed transmission ratio which is implemented to maintain the engine speed at a maximum torque operating speed as opposition to vehicular motion increases.

4. The load meter as set forth in claim 3 above, wherein the fourth indicated magnitude represents a vehicle operating condition wherein the transmission ratio has been reduced to a point where ground speed error has reached a predetermined maximum beyond which further reductions in the transmission ratio are not permitted.

5. The load meter as set forth in claim 4 above, wherein the fifth indicated magnitude is substantially equal to the fourth indicated magnitude and wherein the third magnitude range represents a range of operation wherein the engine is unable to develop sufficient torque to drive the load thereon and continued maintenance of the load on the engine necessarily results in an increase of engine speed error and an increase in magnitude indicated by the load meter.

6. The load meter as set forth in claim 5 above, wherein the load meter indicates a seventh magnitude within the third magnitude range beyond which engine operating speed is too slow to prevent engine stall even if the load is removed from the engine.

7. The load meter as set forth in claim 1 above, wherein the magnitude indicator comprises a pointer adapted to rotate about an axis with the magnitude of angular displacement from a predetermined zero position being proportional to an applied signal.

8. A load meter for a vehicle powered by a gas turbine engine comprising an indicator connected to indicate engine operating speed when the engine is operating at less than full engine power and indicating means connected to indicate a difference between commanded vehicle performance and actual vehicle performance when the engine is operating at full engine power.

9. The load meter as set forth in claim 8 above, wherein the vehicle has a commanded speed selector, wherein the vehicle has an infinitely variable transmission which may be controlled to continuously vary a transmission ratio of ground speed to engine speed, wherein the transmission ratio is reduced when engine power required to maintain a commanded vehicle speed is greater than maximum available engine power until a difference between actual and commanded vehicle speed reaches a predetermined magnitude, and wherein the load meter is arranged to indicate two separate operating ranges when the engine is operating at maximum power, one maximum power range being indicated when the difference between commanded and actual vehicle speed is less than the predetermined magnitude and a second maximum power range being indicated when the difference between commanded and actual vehicle speed is greater than the predetermined magnitude.

10. The load meter as set forth in claim 9 above, wherein the load meter indicates the difference between actual engine speed and engine speed when maximum engine power is being developed in the second maximum power range.

* * * * *

UNITED STATES PATENT AND TRADEMARK OFFICE
CERTIFICATE OF CORRECTION

PATENT NO. : 4,150,565
DATED : April 24, 1979
INVENTOR(S) : Bernard Brandt Poore It is certified that error appears in the above-identified patent and that said Letters Patent are hereby corrected as shown below:

Column 3, line 33, after "operation." and before "gain", "the" should read --The--. Column 9, line 26, "-T5ADJ=" should read --T5ADJ=--; line 28, after "voltage", "V58cout = - (-" should read --V58cout = - (--; line 48, "(-T5ADJ - V1250." should read --(-T5AJD - V1250).--. Column 10, line 62, "(ZV - 0.6/RS3C)" should read --(ZV - 0.6)/(RS3 C)--. Column 13, line 50, after "a" and before "therethrough", "circuit" should read --current--. Column 14, line 64, after "the" and before "ground", "command" should read --commanded--. Column 16, line 26, before "ground", "command" should read --commanded--.

Signed and Sealed this

Second Day of September 1980

[SEAL]

Attest:

SIDNEY A. DIAMOND

Attesting Officer

Commissioner of Patents and Trademarks